US012694127B1

(12) United States Patent
Kudva et al.

(10) Patent No.: US 12,694,127 B1
(45) Date of Patent: Jul. 28, 2026

(54) CONTAINERIZED APPLICATION DEPLOYMENT AND EXECUTION FRAMEWORK

(71) Applicant: o9 Solutions, Inc., Dallas, TX (US)

(72) Inventors: Gautham K. Kudva, Flower Mound, TX (US); Gaurav Agarwal, Bengaluru (IN); Pranav Paruchuri, Bengaluru (IN); Gagan Dhakar, Bengaluru (IN)

(73) Assignee: o9 Solutions, Inc., Dallas, TX (US)

( * ) Notice: Subject to any disclaimer, the term of this patent is extended or adjusted under 35 U.S.C. 154(b) by 0 days.

(21) Appl. No.: 19/349,738

(22) Filed: Oct. 3, 2025

(51) Int. Cl.
*G06F 21/57* (2013.01)
*G06F 9/451* (2018.01)
*G06F 9/54* (2006.01)

(52) U.S. Cl.
CPC ............ *G06F 21/577* (2013.01); *G06F 9/451* (2018.02); *G06F 9/547* (2013.01); *G06F 2221/033* (2013.01)

(58) Field of Classification Search
CPC ........ G06F 9/451; G06F 9/547; G06F 21/577; G06F 2221/033
See application file for complete search history.

(56) References Cited

U.S. PATENT DOCUMENTS

2021/0049002 A1* 2/2021 Myers ................. G06F 9/44505
2022/0012045 A1* 1/2022 Rudraraju ................. G06F 8/36
2023/0244591 A1* 8/2023 Sun ...................... G06F 11/3495
718/104
2023/0319112 A1* 10/2023 Kaimal ................... H04L 63/20
726/1
2023/0385051 A1* 11/2023 Duvur ...................... G06F 8/65
2025/0272409 A1* 8/2025 McNamee ............ G06F 21/577

* cited by examiner

*Primary Examiner* — Jeremy S Duffield
(74) *Attorney, Agent, or Firm* — Schwegman Lundberg & Woessner, P.A.

(57) ABSTRACT

A computer-implemented framework for containerized application deployment that improves container orchestration in distributed computing environments through secure multi-modal data exchange. The system receives third-party container images through registry systems, automatically scans for security vulnerabilities, and promotes validated images to internal registries accessible by container orchestration clusters. The framework generates dynamic pod configurations by modifying templates stored in configuration management systems, enabling runtime parameter customization through cluster management service APIs. A dual-mode data exchange system supports both API-based communication and flat file exchange through shared file systems with multi-tenant isolation. Plugins perform application-specific data transformations and container orchestration, while comprehensive monitoring APIs collect pod status, events, and logs displayed in a platform user interface. The framework enables automated submission, validation, and deployment of third-party applications in controlled environments.

17 Claims, 6 Drawing Sheets

500

505
RECEIVE CONTAINER IMAGE

510
EXECUTE SECURITY SCAN

515
STORE CONTAINER IMAGE IN REGISTRY

520
MODIFY CONFIGURATION TEMPLATE

525
INSTANTIATE CONTAINERIZED APPLICATION

530
GENERATE OUTPUT

535
RENDER OUTPUT

CONTAINERIZED APPLICATION DEPLOYMENT AND EXECUTION FRAMEWORK

TECHNICAL FIELD

Embodiments described herein generally relate to computer application delivery and execution and, in some embodiments, more specifically to containerized application delivery and execution.

BACKGROUND

Modern enterprise software platforms increasingly rely on open architectures that support extensions and custom logic execution implemented in diverse programming languages including Python®, R programming language, and JavaScript®. This architectural flexibility has enabled integration of third-party applications into platforms through application-specific data transformations and exchange mechanisms that can be implemented in the field without requiring modifications to core platform code. Conventional integration approaches have primarily focused on Application Programming Interface (API)-based communication between applications, which has proven effective for applications designed to interact through standardized application programming interfaces. Container orchestration technologies (e.g., Kubernetes®-based systems, etc.) have emerged as dominant platforms for deploying and managing distributed applications, providing standardized mechanisms for application deployment, scaling, and monitoring across diverse computing environments.

Despite the success of API-based integration approaches, significant technical limitations exist when attempting to integrate third-party applications that utilize alternative data exchange mechanisms beyond standard APIs. Existing integration frameworks are not suitable for applications that require different data exchange protocols and need to be hosted in the same environment as the primary platform to achieve optimal performance and low latency requirements. Current container deployment systems lack comprehensive frameworks that provide well-defined contracts for application configuration, data exchange, and logging while simultaneously ensuring security and stability through proper authorization and validation of deployed applications. These limitations create barriers to rapid deployment of third-party containerized applications and prevent organizations from maintaining the flexibility needed to perform quick upgrades and fixes in enterprise environments where diverse applications with varying technical requirements must coexist and integrate seamlessly.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
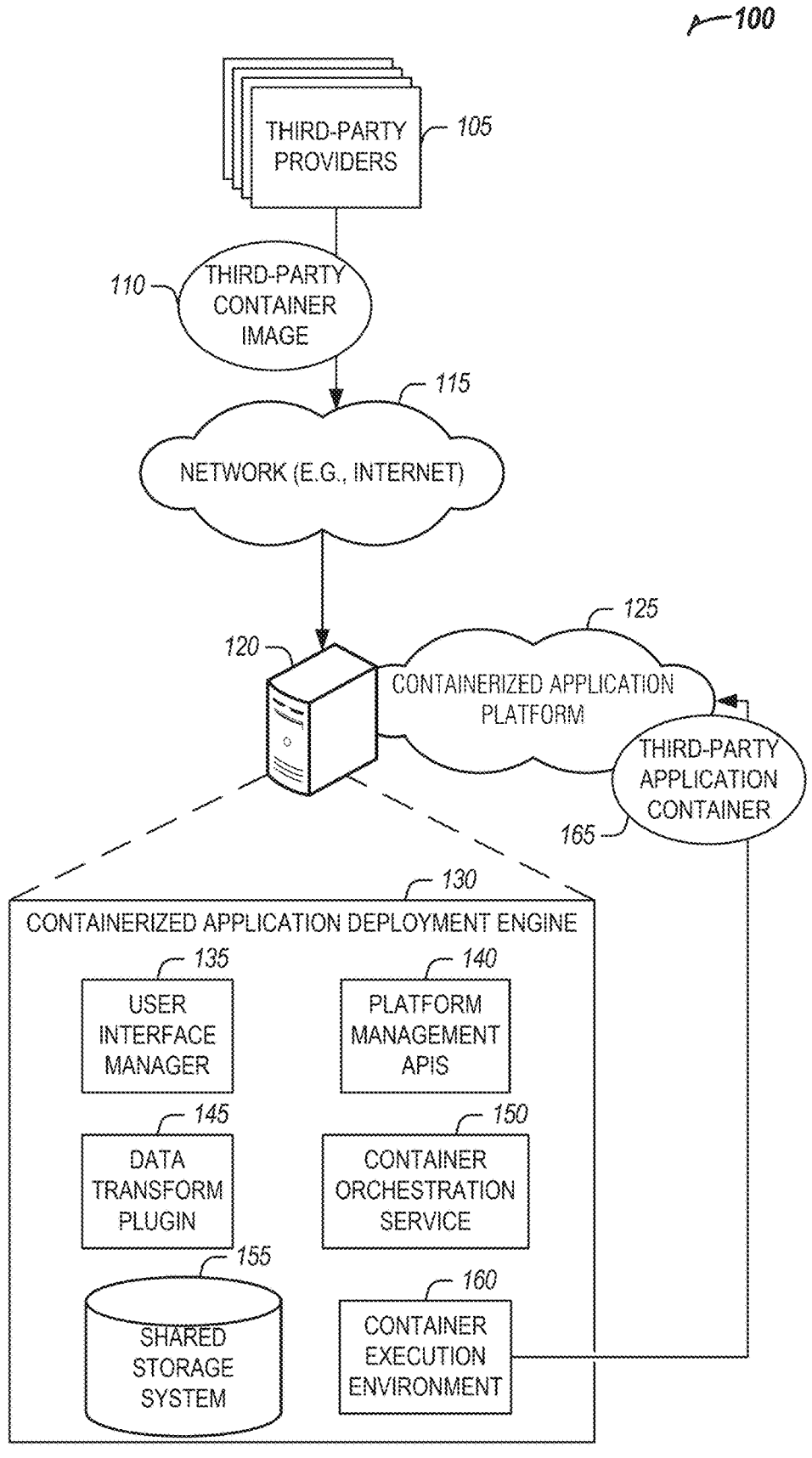
FIG. 1 is a block diagram of an example of an environment and a system for containerized application deployment and execution, according to an embodiment.

The systems and techniques described herein address the technical challenge of integrating third-party applications that cannot utilize standard API-based communication mechanisms and require co-location with the host platform for performance and low latency requirements. Conventional integration approaches work well for applications that interact via APIs but are not suitable for applications that utilize other data exchange mechanisms and need to be hosted in the same environment as the platform.

The systems and techniques described herein solve this problem by providing a comprehensive framework that allows third-party applications to be deployed into the platform via container images with well-defined contracts for application configuration, data exchange, and logging. The framework supports two primary data exchange mechanisms: API-based communication where containers launch application servers with specific endpoints, and flat file exchange through a platform-provided Software Development Kit (SDK) that enables plugins to write files to specific shared network paths that are mounted into third-party containers at designated paths.

The systems and techniques described herein address the technical challenge of ensuring security and stability by controlling which applications can be deployed while maintaining flexibility for rapid upgrades and fixes. The framework must handle the complete lifecycle of third-party container submission, security scanning, and deployment without compromising platform integrity.

The solution incorporates a comprehensive process for automated submission, validation, and deployment of new versions of third-party applications in controlled environments. External parties can publish container images to a controlled container registry, where the security operations team scans images for security vulnerabilities using specialized scanning tools. Only containers that pass security scans are promoted to internal registries accessible by platform clusters (e.g., Kubernetes®, etc.). The framework maintains proper authorization controls to ensure only validated applications can be deployed.

The systems and techniques described herein tackle the technical challenge of managing diverse configuration requirements and resource allocation for different third-party applications across multiple environments while providing flexibility for customization. Each application may have different CPU and memory requirements, startup characteristics, and scaling needs that must be properly orchestrated.

The framework solves this through a sophisticated configuration management system where the Cluster Management Service (CMS) maintains required configurations for sanctioned third-party applications, including resource requirements and environment settings. The system uses a human-readable data serialization language-based pod configurations (e.g., YAML, etc.) available via a container orchestrator (e.g., Kubernetes® ConfigMaps, etc.), with per-environment customizations possible through customer-environment-specific profiles managed in a repository (e.g., Git®, etc.). The framework provides API parameters to override specific configuration options, such as image versions, allowing dynamic customization during container launch.

The systems and techniques described herein address the technical challenge of ensuring proper data isolation across different tenants, applications, and container launches while enabling secure data exchange between the platform and third-party containers. This requires maintaining security boundaries without impeding functionality.

The solution implements data isolation through a shared filesystem that securely exchanges data between third-party application containers and the platform. The platform ensures isolation of shared network paths across different tenants, applications, and container launches. Python® plugins implement well-defined data contracts and perform required data transformations into mutually agreed formats, including various document formats such as Comma Separated Values (CSV), Apache Parquet™, JavaScript® Object Notation (JSON), or Extensible Markup Language (XML), while maintaining proper security boundaries.

The systems and techniques described herein address the technical challenge of providing comprehensive monitoring, logging, and observability for third-party containers to enable proper debugging and operational management. Conventional container deployments often lack integrated monitoring capabilities that work seamlessly with the host platform's observability infrastructure.

The framework solves this by extending the platform's existing observability capabilities to third-party containers. The CMS provides APIs to fetch details about both current and past containers, with comprehensive logging and error handling through the platform SDK. The system collects container logs and pod events, displays them in the platform user interface with drill-down capabilities into individual pod events and logs, and provides real-time monitoring of pod status and execution progress.

The framework has an open architecture and allows extensions and custom logic execution implemented in diverse languages including Python®, R programming language, JavaScript®, etc. This flexibility allows integration of third-party applications into the platform by performing the required integrations through application-specific data transformations and exchange in the field without any core platform code. While this works for applications that interact via APIs, it is not suitable for other applications that utilize other data exchange mechanisms and need to be hosted in the same environment as the platform for performance and low latency.

The framework allows third party applications to be deployed into the platform via container images with well-defined contracts for application configuration, data exchange, and logging. The architecture further supports security and stability by only allowing properly authorized and validated applications to be deployed while preserving the flexibility to rapidly perform upgrades and fixes.

The disclosed framework provides a comprehensive solution for deploying and executing third-party containerized applications within a host platform environment. The framework addresses the limitations of traditional Application Programming Interface (API) based integration approaches by enabling third-party applications that utilize alternative data exchange mechanisms and require co-location with the host platform for optimal performance and low latency. The system architecture incorporates several key components working in concert: a plugin that contains application-specific code defining data exchange contracts and performing required data transformations, a cluster management service that maintains configurations for sanctioned third-party applications and provides APIs for launching and monitoring applications, and a shared filesystem for secure data exchange between third-party application containers and the host platform.

The framework implements a sophisticated container deployment and management system that ensures security and stability while maintaining operational flexibility. Third-party container images are submitted through a controlled process where external parties can publish images to a managed container registry, followed by automated security vulnerability scanning using specialized tools. Containers that successfully pass security validation are promoted to internal registries accessible by the platform clusters. The framework supports comprehensive configuration management through pod configurations available via a platform orchestrator (e.g., Kubernetes® ConfigMaps, etc.), with per-environment customizations enabled through customer-environment-specific profiles managed in a repository. The framework provides API parameters for dynamic configuration overrides, such as image versions, allowing flexible customization during container launch while maintaining proper resource allocation based on CPU and memory requirements, startup characteristics, and scaling needs.

The framework facilitates data exchange through mechanisms designed to accommodate diverse application requirements. For API-based communication, containers can launch application servers with specific endpoints that container clients can interact with for both control messages and data input/output. For flat file exchange, a platform SDK is provided that enables plugins to write files to specific shared network paths mounted into third-party containers at designated paths. The platform ensures proper data isolation across different tenants, applications, and container launches while supporting various document formats including CSV, Parquet, JSON, XML, etc. Additionally, the framework extends existing observability capabilities to third-party containers, providing comprehensive monitoring and logging through APIs that fetch details about current and past containers, with integrated user interface displays offering drill-down capabilities into individual pod events and logs for effective debugging and operational management.

FIG. 1 is a block diagram of an example of an environment 100 a system 130 for containerized application deployment and execution, according to an embodiment. The environment includes third-party providers 105 (e.g., partners, vendors, etc.) operating application delivery systems that provide applications to a containerized application platform 125. The third-party providers 105 systems are communicatively coupled to a server 120 (e.g., a cloud computing platform, a computing cluster, an internal cloud, an external cloud, a standalone service computer, a virtual server, etc.) via a network 115 (e.g., the Internet, wireless network, cellular network, satellite network, local area network, wide area network, etc.).

The server 120 includes the system 130. In an example, the system 130 is a containerized application deployment engine. The system includes a variety of components such as a user interface manager 135, platform management APIs 140, a data transform plugin 145, a container orchestration service 150, a shared storage system 155, and a container execution environment 160.

The user interface manager 135 serves as an interaction point for users of the containerized application platform 125 to initiate and monitor containerized application deployments. This user interface manager 135 provides a comprehensive web-based interface that displays job execution information in structured tabular formats, including job names, application types, start times, end times, execution status, and duration metrics. The interface incorporates filtering and refresh capabilities that enable users to modify display parameters and retrieve real-time information about container execution states. The user interface manager 135 includes hierarchical monitoring views that allow users to drill down from job-level information to individual pod details, providing visibility into container lifecycle states, resource utilization metrics, and diagnostic information. Interactive elements within the interface include action buttons for accessing detailed logs, canceling running processes, and viewing comprehensive execution analytics. The user interface manager 135 interacts directly with the platform management APIs 140 to retrieve job status information, submit new deployment requests, and access historical execution data for monitoring and troubleshooting purposes.

The platform management APIs 140 function as a central programmatic interface layer that coordinates container orchestration and management operations within the containerized application platform 125. These APIs provide standardized endpoints for container lifecycle management, including deployment initiation, status monitoring, resource allocation, and termination operations. The platform management APIs 140 implement authentication and authorization mechanisms to ensure that only properly validated requests can trigger container operations, supporting multitenant environments with appropriate security boundaries. The platform management APIs 140 maintain integration points with external container registries, security scanning services, and monitoring systems to provide comprehensive application lifecycle management capabilities. These APIs support both synchronous and asynchronous operation patterns, enabling real-time status queries while accommodating long-running container deployment and execution processes. The platform management APIs 140 interact bidirectionally with the user interface manager 135 to serve user requests and provide status updates, while also communicating with the container orchestration service 150 to translate high-level deployment requests into specific container management operations.

The data transform plugin 145 contains application-specific code that defines data exchange contracts between third-party applications of the third-party providers 105 and the containerized application platform 125, serving as an integration adapter component. This plugin implements standardized SDK interfaces for file system operations, API communications, and logging mechanisms, with support for multiple data formats. The plugin executes transformation logic that converts platform-native data structures into formats required by third-party applications, utilizing configurable field mapping specifications and validation rules for data integrity verification. The data transform plugin 145 implements both input and output transformation capabilities, handling data format conversions, structure modifications, and validation processes to ensure compatibility between heterogeneous application environments. The plugin provides error handling and logging capabilities that capture transformation failures and data quality issues for diagnostic purposes. The data transform plugin 145 interacts with the container orchestration service 150 to initiate container deployment requests with specific configuration parameters, while simultaneously interfacing with the shared storage system 160 to write transformed input data and retrieve processed output data from third-party applications.

The container orchestration service 150 functions as a central coordination component that manages the lifecycle of third-party containerized applications within the containerized application platform 125. This service maintains configuration repositories for sanctioned applications, including resource requirements, environment settings, security contexts, and deployment specifications stored in various formats and accessible via configuration management systems. The service implements container image validation processes that include security vulnerability scanning using tools with automated promotion of validated images to internal container registries accessible by clusters in the containerized application platform 125. The container orchestration service 150 provides APIs for launching applications, monitoring execution progress, collecting application logs, and publishing error information to platform interfaces. The service supports per-environment customizations through customer-specific configuration profiles managed in version control repositories, with additional flexibility provided through API parameters that can override specific configuration options such as image versions, resource allocations, and environment variables. The container orchestration service 150 interacts with the platform management APIs 140 to receive high-level deployment requests, communicates with the data transform plugin 145 to coordinate data transformation operations, interfaces with the container execution environment 160 to orchestrate pod creation and management, and utilizes the shared storage system 155 to configure data exchange mechanisms for deployed containers.

The shared storage system 155 provides secure, highperformance data exchange capabilities between the containerized application platform 125 and third-party application containers, implementing a distributed storage abstraction layer designed for multi-tenant environments using network-attached storage protocols, distributed file system architectures, or cloud-native storage services with encryption capabilities and granular access control mechanisms to ensure data security and isolation. The shared storage system 155 uses path isolation across different tenants, applications, and container launches, with mounted file system paths configured at designated locations within third-party containers to enable secure data exchange. The shared storage system 155 supports both high-throughput batch data processing and real-time streaming data operations, with configurable performance characteristics based on application requirements. The system provides SDKbased interfaces that enable plugins to write files to specific shared network paths while maintaining security boundaries and access controls. The shared storage system 155 interacts with the data transform plugin 145 to receive transformed input data and provide access to application output data, while simultaneously interfacing with the container execution environment 160 to mount storage volumes into container instances and with a third-party application container 165 to enable direct file system access for data processing operations.

The container execution environment 160 provides an underlying container orchestration platform with comprehensive pod scheduling, resource management, and lifecycle coordination capabilities. This environment implements native APIs for container deployment, with support for automated node provisioning through infrastructure-as-code tools for dynamic resource scaling. The container execution environment 160 manages container placement decisions based on resource requirements, node selection criteria, affinity rules, and availability constraints specified in deployment configurations. The container execution environment 160 includes monitoring and observability capabilities that track container execution states, resource utilization metrics, and performance characteristics, with integration to platform monitoring interfaces for comprehensive visibility. The container execution environment 160 supports various container runtime specifications, security contexts, and networking configurations required for third-party application execution. The container execution environment 160 receives deployment requests from the container orchestration service 150 with specific pod configurations and resource specifications, coordinates with the shared storage system 155 to mount required storage volumes into container instances and manages the lifecycle of the third-party application container 165 instances including startup, monitoring, and termination operations.

The third-party application container 165 represents an encapsulated third-party application created from a third-party container image 110 received from one of the third-party providers 105 that executes within the containerized application platform 125 according to well-defined contracts for configuration, data exchange, and logging. The third-party container image 110 represents a packaged application artifact that encapsulates a complete software application along with its dependencies, runtime environments, and configuration requirements necessary for execution within the containerized deployment framework. These container images are provided by external entities or internal teams and contain applications that cannot effectively communicate through standard API mechanisms, requiring hosting within the same environment as the primary platform for performance and low latency requirements. The third-party container image 110 includes specialized libraries, computational frameworks, and runtime dependencies that may not be available in the base platform environment, enabling integration of applications developed in diverse programming languages and utilizing proprietary algorithms or data processing capabilities. Before deployment, these container images undergo a comprehensive validation process where they are scanned for security vulnerabilities.

The third-party application container 165 operates with dependency isolation, including specialized libraries, runtime environments, and computational frameworks for application functionality. The third-party application container 165 includes standardized interfaces for data input and output operations, utilizing either API-based communication mechanisms or file-based data exchange patterns depending on application requirements and integration specifications. The third-party application container 165 executes according to resource constraints and security contexts defined in deployment configurations, with access to mounted storage volumes for data processing operations. The third-party application container 165 provides logging and monitoring interfaces that enable the platform to collect execution information, error conditions, and performance metrics for observability purposes. The third-party application container 165 is managed by the container execution environment 160 for lifecycle operations, accesses data through the shared storage system 155 for input and output operations and operates according to configuration specifications coordinated by the container orchestration service 150, while providing execution results that can be processed by the data transform plugin 145 for platform integration.

When the third-party container image 110 is received, the container orchestration service 150 initiates a comprehensive validation and deployment process. The received third-party container image 110 is subjected to security vulnerability scanning using tools and provided the scan passes the image is promoted to internal container registries. The container orchestration service 150 retrieves an appropriate pod configuration, which contain formatted templates that specify default settings for image versions, environment variables, resource requests, and node selection criteria. When a deployment request is received from the data transform plugin 145 with configuration parameters, the container orchestration service 150 translates these application-level requirements into cluster-specific operations with cluster configuration parameters directed to the container execution environment 160. The container execution environment 160 executes node initiation operations to provision necessary compute resources based on CPU and memory requirements, then performs pod launching operations to instantiate the third-party application container 165 within an allocated pod. During container creation, the shared storage system 155 mounts designated file system paths into the container instance to enable secure data exchange, while the container operates according to the well-defined contracts for application configuration, data exchange, and logging established during the integration process. After the third-party application container 165 is successfully launched, a monitoring loop is established where the data transform plugin 145 periodically invokes pod status checking operations against the container orchestration service 150 to track container execution states including running, succeeded, completed, failed, or unknown status conditions.

Figure 2:
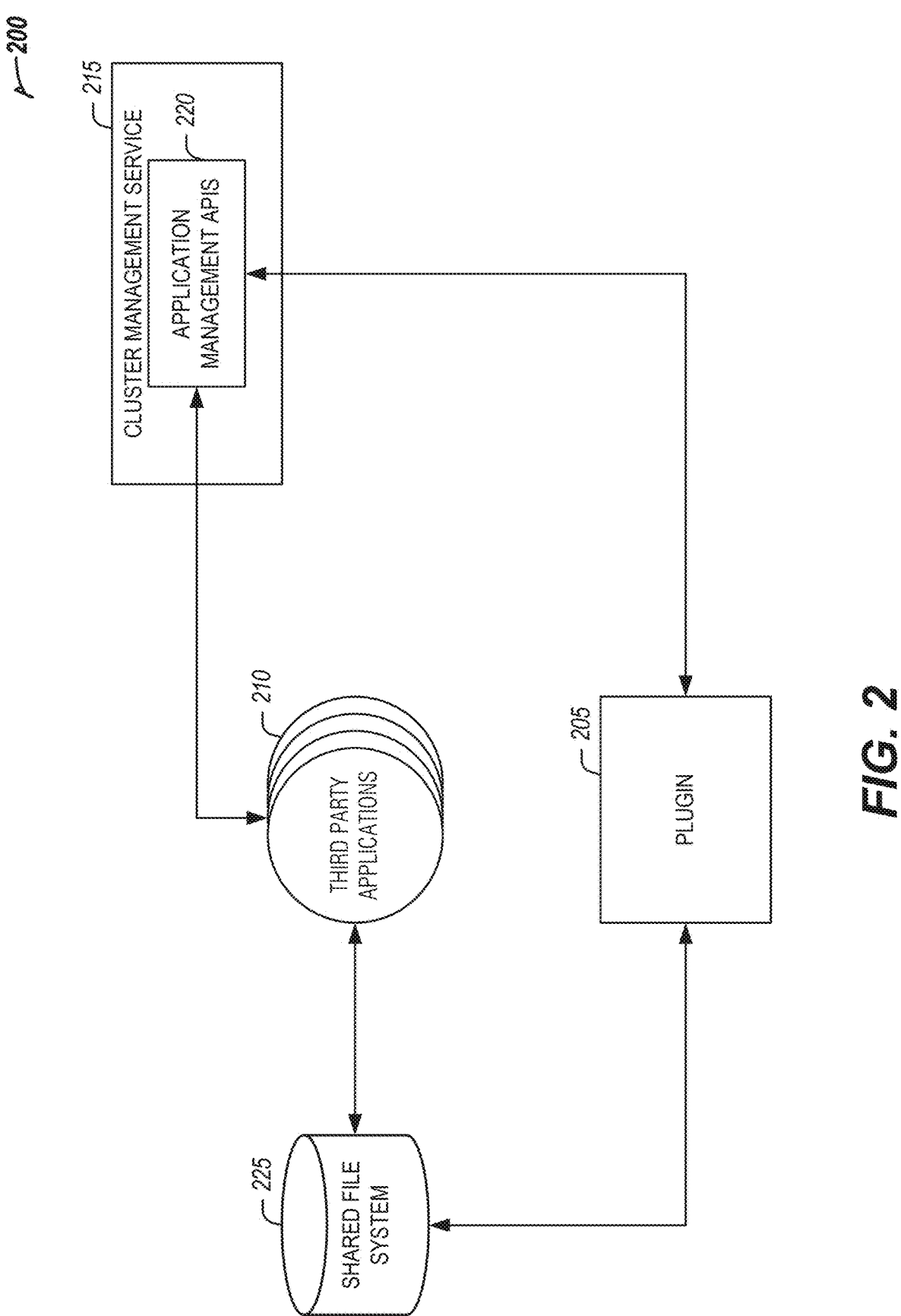
FIG. 2 is a block diagram of an example of a framework for containerized application deployment and execution, according to an embodiment.

FIG. 2 is a block diagram of an example of a framework 200 for containerized application deployment and execution, according to an embodiment. The framework 200 includes a plugin 205 that contains application-specific code that defines a data exchange contract between third-party applications 210 and a cluster management service (CMS) 215. The plugin 205 performs data-transformations The CMS 215 maintains configurations for the third-party applications 210 including resource requirements, environment settings, etc. The CMS 215 provides APIs 220 that can be invoked by the plugin 205 to launch the third-party applications 210 and monitor progress as well as collect and publish application info and error logs. A shared filesystem 225 is used to securely exchange data between the third-party application 210 container and the CSM 215.

Figure 3:
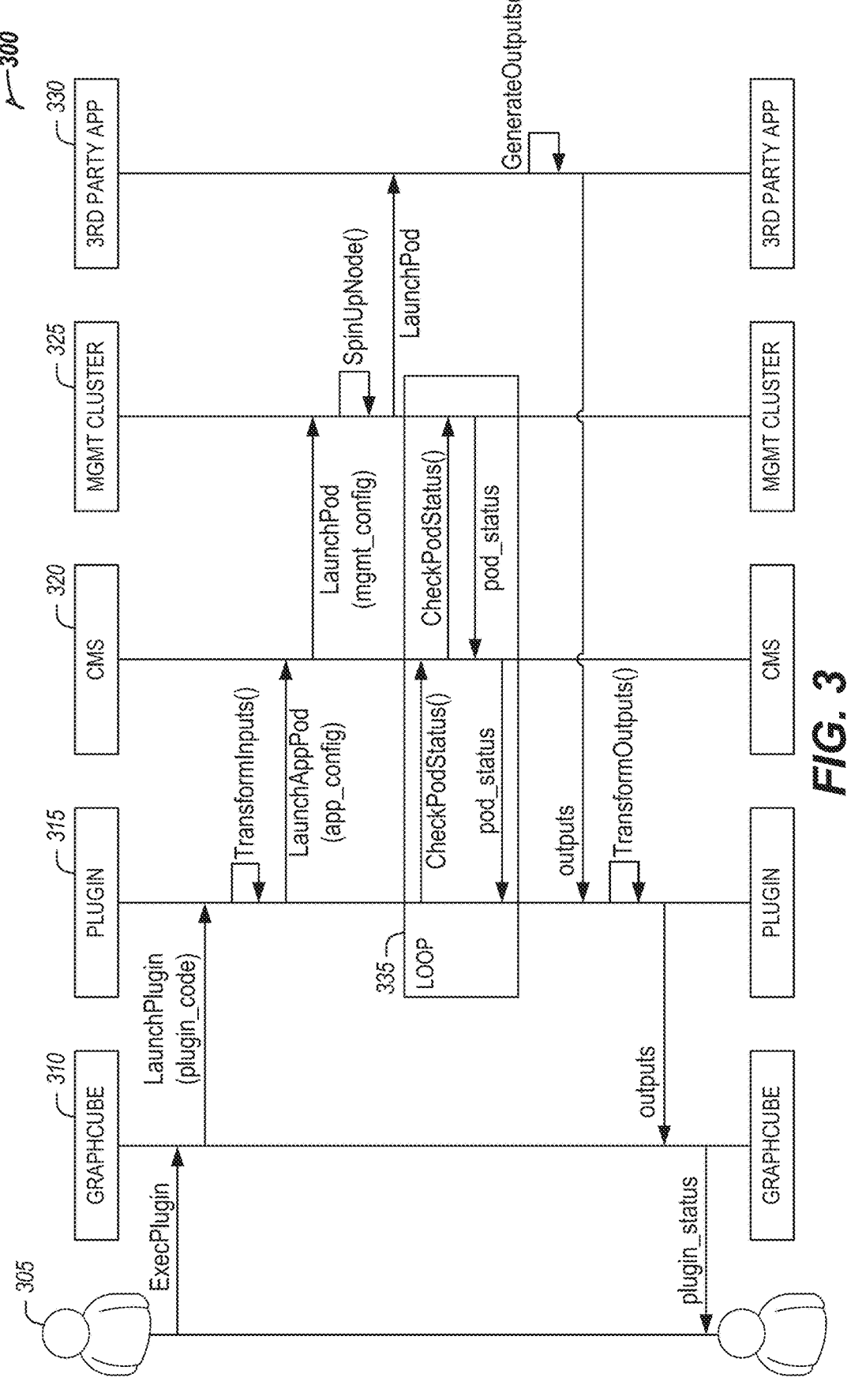
FIG. 3 is a data flow diagram illustrating an example control flow for containerized application deployment and execution, according to an embodiment.

FIG. 3 is a data flow diagram illustrating an example control flow 300 for containerized application deployment and execution, according to an embodiment. A user application 305 initiates an action that requests execution of a plugin 315 (e.g., the plugin 205, etc.) to a graph cube 310. The graph cube 310 launches the plugin 315 which in turn transforms the inputs and launches an app pod with a configuration management service (CMS) 320. The CMS 320 launches the pod via a management application cluster 325 which in turn spins up a node and launches the pod with a third-party application 330. The plugin 315 the performs a loop 335 to check pod status with the CMS 320 which in turn checks the pod status with the management application cluster 325. The management application cluster 325 returns a pod status to the CMS 320 which in turn passed the pod status to the plugin 315. The loop 335 continues while the pod is processing inputs.

The loop 335 is complete when the third-party application 330 generates outputs that are transmitted to the plugin 315. In an example, the outputs may flow through the management application cluster 325 and the CMS 320 for delivery to the plugin 315. The plugin 315 transforms the outputs and transmits the transformed outputs to the graph cube 310 which in turn provides a plugin status to the user application 305.

Table 1 is an example of computer code that will launch a container with overridden configuration using a plugin (e.g., the plugin 205, etc.).

TABLE 1

```
import logging
import time
from corp_pod_executor import pod_executor
logger = logging.getLogger("corp_logger")
logger.info("Starting Container Execution")
container = pod_executor.setup_container(container_name="shared-
patterns-containerized",
            tag="latest",
            args=["--input_path", "xyz", "--output_path", "abc"],
            env={"x": "abc"}
)
pod_id = pod_executor.launch_pod(type="shared-patterns",
container_configs=[container])
if pod_id:
    logger.info(f"pod {pod_id} created successfully")
    while True:
        pod_status = pod_executor.get_pod_status(type="shared-patterns",
pod_id=pod_id)
        if pod_status:
            if pod_status in ["Succeeded", "Completed", "Failed", "Unknown"]:
                logger.info("Pod Execution Complete")
                break
            else:
                logger.error(f"Pod State {pod_status}")
                events = pod_executor.get_pod_events(type="shared-patterns",
pod_id=pod_id)
                logger.warning(f"Pod Events {events}")
                time.sleep(60)
        else:
            continue
else:
    logger.error(f"Could not create pod")
out_df = None
```

Figure 4:
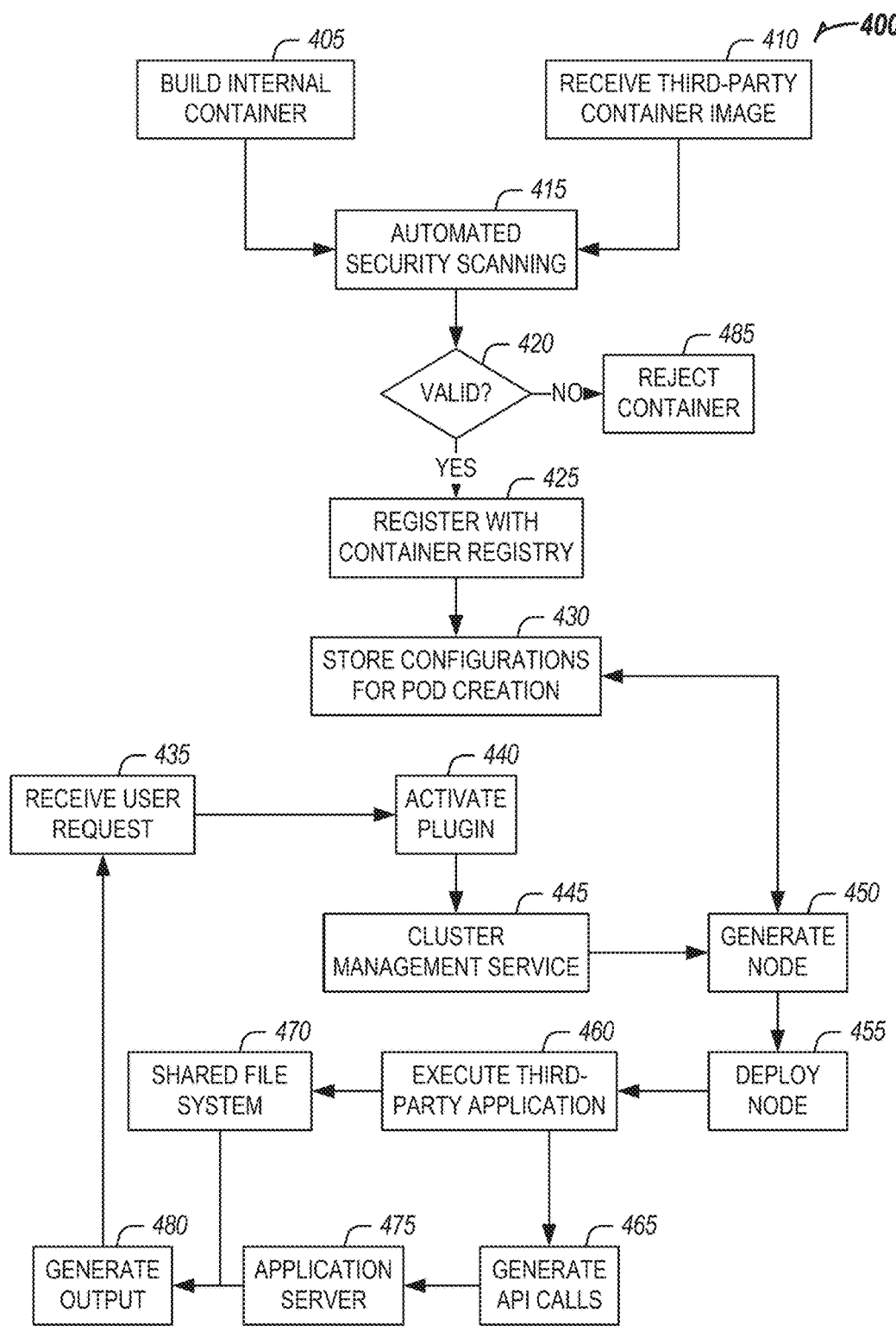
FIG. 4 illustrates a flow diagram of an example of a process for containerized application deployment and execution, according to an embodiment.

FIG. 4 illustrates a flow diagram of an example of a process 400 for containerized application deployment and execution, according to an embodiment. The process 400 may provide features as described in FIGS. 1 to 3.

The process 400 begins with container image submission through two primary pathways. At operation 405, internal development builds and push container images directly via a developer pipeline. At operation 410, container images are received from a third-party (e.g., vendors, partners, etc.). The internal and third-party container images converge at operation 415 where automated security scanning is completed to determine whether the container images meet the required security standards. At decision 420, it is determined if the container image is valid based on the security scan. If it is determined at decision 420 that the image is not valid, the container image is rejected at operation 485. If it is determined at decision 420 that the container image is valid, the container image is registered with a container repository at operation 425. The container repository serves as a central repository for container images available for deployment within the container network. At operation 430, the container image is stored in the container registry and is accessible by clusters. The validated container images enter a configuration management layer that maintains required configurations for sanctioned third-party applications including resource requirements and environment settings. The configuration management layer utilizes configuration templates that provide defaults for pod creation, where image, environment, arguments, resource requests etc. can be changed via certain parameters in a pod creation API payload.

At operation 435, a user request is initiated that flows through a graph cube to a plugin that is activated at operation 440. The plugin contains application-specific code that defines a data exchange contract between a third-party application and an internal platform and is responsible for performing data transformations, input processing, and container orchestration.

The plugin interfaces with a cluster management service (CMS) that provides an API that can be invoked by the plugin to launch third-party applications and monitor their progress as well as collect and publish application information and error logs. The CMS orchestrates deployment to a cluster to generate a node at operation 450 by performing node provisioning through automated jobs, pod creation, resource allocation, and service creation.

The node is deployed at operation 455 executing as a third-party application at operation 460 within the cluster environment performing container execution, data processing, and output generation. Communication between the third-party application and other network entities occurs through a data exchange layer that supports dual-mode communication. At operation 465, API calls are generated to cause the container to launch an application server with API endpoints at operation 475. At operation 470, a shared file system is accessed for flat file exchange. The platform ensures isolation of shared file system paths across different tenants, applications, and container launches.

Throughout the entire process 400, a monitoring an observability system provides comprehensive oversight through pod status monitoring, event collection, log aggregation, user interface (UI) dashboard presentation, and historical data retention. The monitoring an observability system provides APIs to fetch details about current and past containers, displayed in the platform UI with an ability to drill down into individual pod events and logs.

At operation 480, an output processing layer generates output using data transformation, result validation, and platform integration, to ensure that results from third-party applications are properly formatted and integrated back into the platform ecosystem. This comprehensive framework enables the deployment of third-party-developed containerized applications with configuration-driven data exchange and integration while incorporating automated submission, validation, and deployment processes for new versions of third-party applications in controlled environments.

Figure 5:
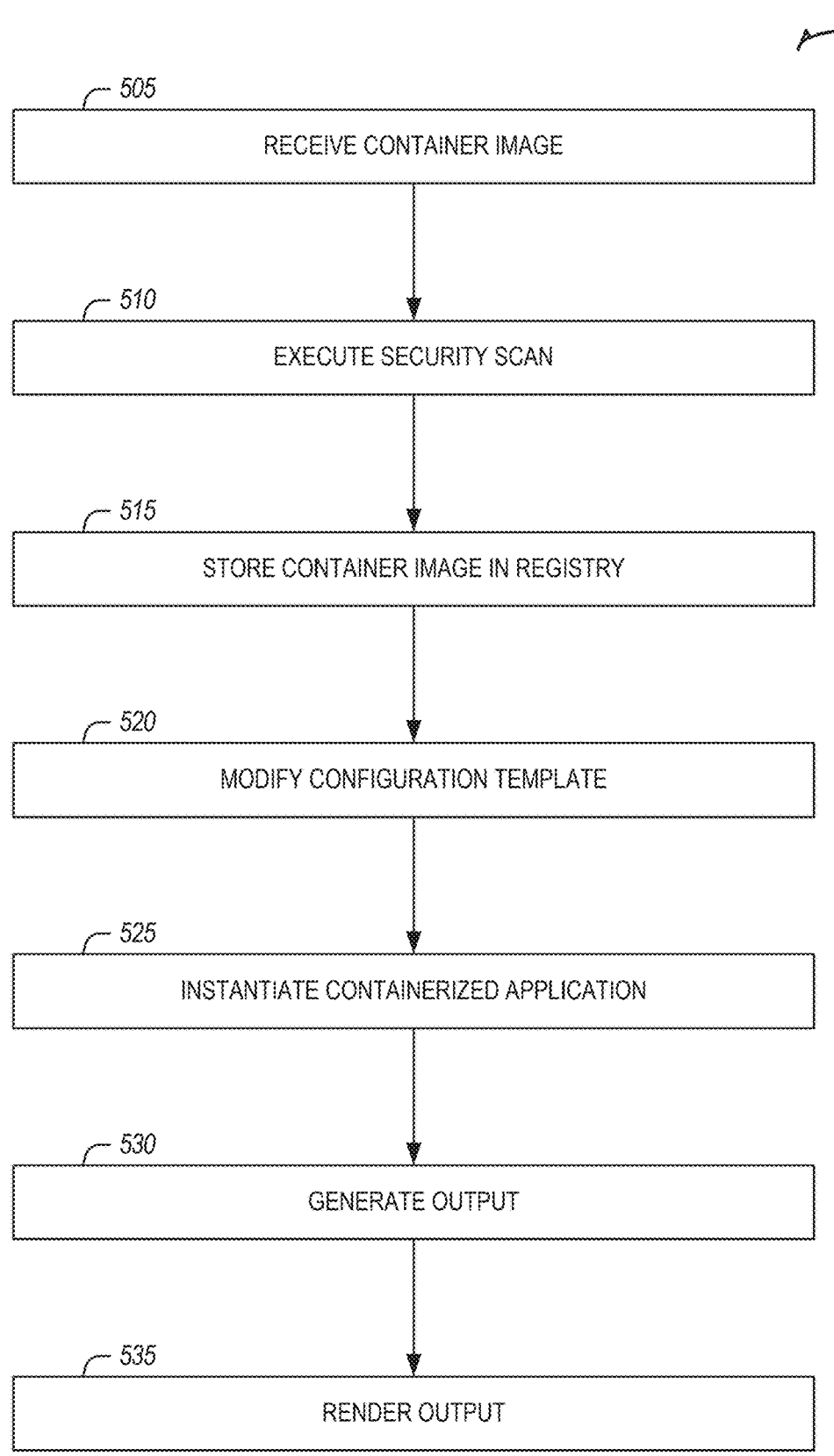
FIG. 5 illustrates an example of a method for containerized application deployment and execution, according to an embodiment.

FIG. 5 illustrates an example of a method 500 for containerized application deployment and execution, according to an embodiment. The method 500 may provide features as described in FIGS. 1 to 4.

At operation 505, a third-party container image is received at a container registry system. In an example, container images from internal teams may be processed through an automated deployment pipeline that executes build and push operations to the container registry system. In an example, external parties may be granted access to a platform-controlled container registry and processing their published container images.

At operation 510, automated security scanning is executed to analyze the third-party container image for security vulnerabilities. In an example, execution of the automated security scanning may include running a security vulnerability scanning tool that identifies security vulner-abilities before storage of the third-party container image to the internal registry.

At operation 515, upon verification of output of the automated security scanning, the third-party container image is stored in an internal registry accessible by container orchestration clusters. At operation 520, a configuration template associated with the third-party container image is modified using custom request variables through a cluster management service API payload to generate a dynamic pod configuration. In an example, the configuration template may be modified to change an image, an environment, arguments, or resource request parameters.

At operation 525, a third-party containerized application is instantiated in a container orchestration cluster by execut-ing the dynamic pod configuration through a cluster man-agement service using API calls from a platform plugin. In an example, automated infrastructure provisioning opera-tions may be executed that allocate container orchestration node-pools based on central processing unit and memory requirements of individual containers and container startup requirements.

At operation 530, in response to a user request, using the third-party containerized application, output is generated that was returned as a response to API calls to execute the third-party containerized application using data from a shared data repository. In an example, platform plugins may be executed that process application-specific code defining data exchange contracts between third-party applications and the platform and data transformation operations may be performed including CSV, Parquet, JSON, and XML format processing.

At operation 535, the output is rendered in a platform user interface.

Figure 6:
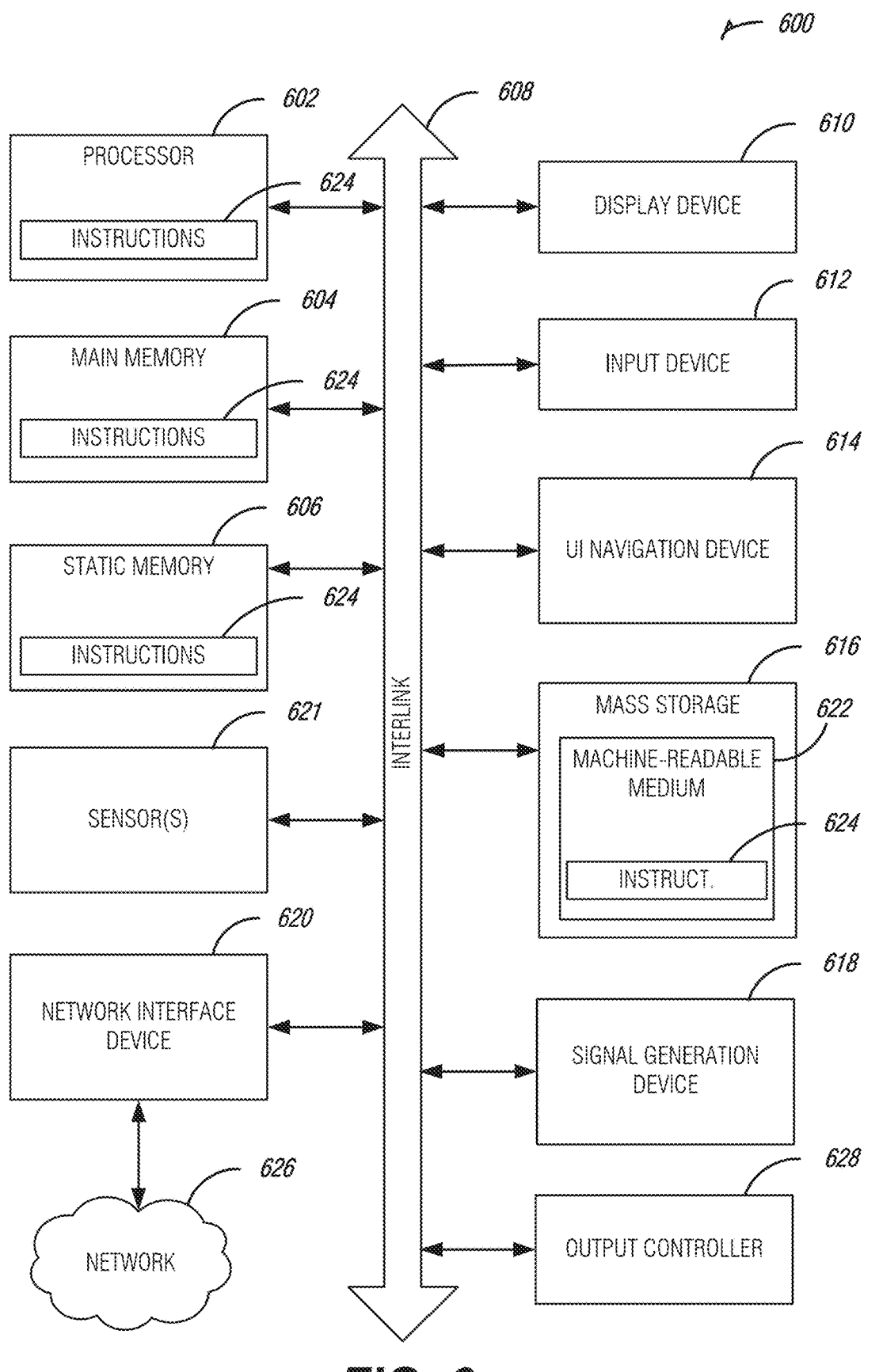
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environ-ment. The machine 600 may be a personal computer (PC), a tablet PC, a set-top box (STB), a personal digital assistant (PDA), a mobile telephone, a web appliance, a network router, switch or bridge, or any machine capable of execut-ing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mecha-nisms. Circuit sets are a collection of circuits implemented in tangible entities that include hardware (e.g., simple cir-cuits, gates, logic, etc.). Circuit set membership may be flexible over time and underlying hardware variability. Cir-cuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer read-able medium physically modified (e.g., magnetically, elec-trically, moveable placement of invariant massed particles, etc.) to encode instructions of the specific operation. In connecting the physical components, the underlying electri-cal properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communi-catively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 600 may include a hardware processor 602 (e.g., a central processing unit (CPU), a graphics processing unit (GPU), a hardware pro-cessor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensors. The machine 600 may include an output controller 628, such as a serial (e.g., universal serial bus (USB), parallel, or other wired or wireless (e.g., infrared (IR), near field communi-cation (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a central-ized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the tech-niques of the present disclosure, or that is capable of storing, encoding or carrying data structures used by or associated with such instructions. Non-limiting machine-readable medium examples may include solid-state memories, and optical and magnetic media. In an example, machine readable media may exclude transitory propagating signals (e.g., non-transitory machine-readable storage media). Specific examples of non-transitory machine-readable storage media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, LoRa®/LoRaWAN® LPWAN standards, etc.), IEEE 802.15.4 family of standards, peer-to-peer (P2P) networks, 3rd Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

Additional Notes

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for registering third-party container images with a platform comprising:

at least one processor; and memory comprising instructions that, when executed by the at least one processor, cause the at least one processor to perform operations to:

receive a third-party container image at a container registry system;

execute automated security scanning to analyze the third-party container image for security vulnerabilities;

upon verification of output of the automated security scanning, store the third-party container image in an internal registry accessible by container orchestration clusters;

modify a configuration template associated with the third-party container image using custom request variables through a cluster management service Application Programming Interface (API) payload to generate a dynamic pod configuration;

execute platform plugins that process application-specific code defining data exchange contracts between third-party applications and the platform;

instantiate a third-party containerized application in a container orchestration cluster by executing the dynamic pod configuration through a cluster management service using API calls from a platform plugin;

generate, in response to a user request, using the third-party containerized application, second output returned as a response to API calls to execute the third-party containerized application using data from a shared data repository, wherein generating the second output comprises performing data transformation operations including Comma Separated Values (CSV), Apache Parquet, JavaScript Object Notation (JSON), and Extensible Markup Language (XML) format processing; and render the second output in a platform user interface.

2. The system of claim 1, the instructions to receive the third-party container image further comprising instructions to process container images from internal teams through an automated deployment pipeline that executes build and push operations to the container registry system.

3. The system of claim 1, the instructions to receive the third-party container image further comprising instructions to grant external parties access to a platform-controlled container registry and processing published container images of the external parties.

4. The system of claim 1, the instructions to execute the automated security scanning further comprising instructions to run a security vulnerability scanning tool that identifies the security vulnerabilities before executing storage of the third-party container image to the internal registry.

5. The system of claim 1, the instructions to instantiate the third-party containerized application further comprising instructions to execute automated infrastructure provisioning operations that allocate container orchestration node-pools based on central processing unit and memory requirements of individual containers and container startup requirements.

6. The system of claim 1, the instructions to modify the configuration template further comprising instructions to change the third-party container image, an environment, arguments, or resource request parameters.

7. At least one non-transitory machine-readable medium comprising instructions for registering third-party container images with a platform that, when executed by at least one processor, cause the at least one processor to perform operations to:

receive a third-party container image at a container registry system;

execute automated security scanning to analyze the third-party container image for security vulnerabilities;

upon verification of output of the automated security scanning, store the third-party container image in an internal registry accessible by container orchestration clusters;

modify a configuration template associated with the third-party container image using custom request variables through a cluster management service Application Programming Interface (API) payload to generate a dynamic pod configuration;

execute platform plugins that process application-specific code defining data exchange contracts between third-party applications and the platform;

instantiate a third-party containerized application in a container orchestration cluster by executing the dynamic pod configuration through a cluster management service using API calls from a platform plugin;

generate, in response to a user request, using the third-party containerized application, second output returned as a response to API calls to execute the third-party containerized application using data from a shared data repository, wherein generating the second output comprises performing data transformation operations including Comma Separated Values (CSV), Apache Parquet, JavaScript Object Notation (JSON), and Extensible Markup Language (XML) format processing; and render the second output in a platform user interface.

8. The at least one non-transitory machine-readable medium of claim 7, the instructions to receive the third-party container image further comprising instructions to process container images from internal teams through an automated deployment pipeline that executes build and push operations to the container registry system.

9. The at least one non-transitory machine-readable medium of claim 7, the instructions to receive the third-party container image further comprising instructions to grant external parties access to a platform-controlled container registry and processing published container images of the external parties.

10. The at least one non-transitory machine-readable medium of claim 7, the instructions to execute the automated security scanning further comprising instructions to run a security vulnerability scanning tool that identifies the security vulnerabilities before executing storage of the third-party container image to the internal registry.

11. The at least one non-transitory machine-readable medium of claim 7, the instructions to instantiate the third-party containerized application further comprising instructions to execute automated infrastructure provisioning operations that allocate container orchestration node-pools based on central processing unit and memory requirements of individual containers and container startup requirements.

12. The at least one non-transitory machine-readable medium of claim 7, the instructions to modify the configuration template further comprising instructions to change the third-party container image, an environment, arguments, or resource request parameters.

13. A computer-implemented method for registering third-party container images with a platform comprising:

receiving a third-party container image at a container registry system;

executing automated security scanning to analyze the third-party container image for security vulnerabilities;

upon verification of output of the automated security scanning, storing the third-party container image in an internal registry accessible by container orchestration clusters;

modifying a configuration template associated with the third-party container image using custom request variables through a cluster management service Application Programming Interface (API) payload to generate a dynamic pod configuration;

execute platform plugins that process application-specific code defining data exchange contracts between third-party applications and the platform;

instantiating a third-party containerized application in a container orchestration cluster by executing the dynamic pod configuration through a cluster management service using API calls from a platform plugin;

generating, in response to a user request, using the third-party containerized application, second output returned as a response to API calls to execute the third-party containerized application using data from a shared data repository, wherein generating the second output comprises performing data transformation operations including Comma Separated Values (CSV), Apache Parquet, JavaScript Object Notation (JSON), and Extensible Markup Language (XML) format processing; and rendering the second output in a platform user interface.

14. The computer-implemented method of claim 13, wherein receiving the third-party container image comprises processing container images from internal teams through an automated deployment pipeline that executes build and push operations to the container registry system.

15. The computer-implemented method of claim 13, wherein receiving the third-party container image comprises granting external parties access to a platform-controlled container registry and processing published container images of the external parties.

16. The computer-implemented method of claim 13, wherein executing the automated security scanning comprises running a security vulnerability scanning tool that identifies the security vulnerabilities before executing storage of the third-party container image to the internal registry.

17. The computer-implemented method of claim 13, wherein instantiating the third-party containerized application further comprises executing automated infrastructure provisioning operations that allocate container orchestration node-pools based on central processing unit and memory requirements of individual containers and container startup requirements.

\*    \*    \*    \*    \*